US012237636B2

(12) United States Patent
Cui et al.

(10) Patent No.: US 12,237,636 B2
(45) Date of Patent: Feb. 25, 2025

(54) METHOD AND SYSTEM FOR MACHINE DETERMINING WIRE CONTACT INSERTION

(71) Applicant: THE BOEING COMPANY, Chicago, IL (US)

(72) Inventors: Michael Cui, Woodland Hills, CA (US); Heiko Hoffmann, Simi Valley, CA (US); Bradley J. Mitchell, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 441 days.

(21) Appl. No.: 17/660,327

(22) Filed: Apr. 22, 2022

(65) Prior Publication Data

US 2023/0344186 A1    Oct. 26, 2023

(51) Int. Cl.
| | |
|---|---|
| G06K 9/00 | (2022.01) |
| G06T 7/00 | (2017.01) |
| G06T 7/136 | (2017.01) |
| G06T 7/55 | (2017.01) |
| G06T 7/60 | (2017.01) |
| H01R 43/20 | (2006.01) |
| B25J 9/16 | (2006.01) |

(52) U.S. Cl.
CPC ......... H01R 43/20 (2013.01); G06T 7/0004 (2013.01); G06T 7/136 (2017.01); G06T 7/55 (2017.01); G06T 7/60 (2013.01); *B25J 9/1687* (2013.01)

(58) Field of Classification Search
CPC .......... H01R 43/20; G06T 7/136; G06T 7/55; G06T 7/0004; G06T 7/60; B25J 9/1687

USPC ....................................................... 382/141
See application file for complete search history.

(56) References Cited

U.S. PATENT DOCUMENTS

| | | | |
|---|---|---|---|
| 9,327,405 B2 * | 5/2016 | Shiota | B25J 9/1669 |
| 10,288,410 B2 | 5/2019 | Hoffmann | |
| 11,151,405 B1 | 10/2021 | Hoffmann | |
| 11,171,459 B2 * | 11/2021 | Hoffmann | B25J 9/1687 |

(Continued)

OTHER PUBLICATIONS

Cirillo, Pasquale, Gianluca Laudante, and Salvatore Pirozzi. "Vision-based robotic solution for wire insertion with an assigned label orientation." IEEE Access 9 (2021): 102278-102289. (Year: 2021).*

(Continued)

*Primary Examiner* — Jonathan S Lee
(74) *Attorney, Agent, or Firm* — Yee & Associates, P.C.

(57) ABSTRACT

A method, system and computer program product are provided for determining wire contact insertion based on image analysis. Methods include: acquiring at least one image of a connector having a plurality of wire contact insertion holes; identifying a wire contact within a wire contact insertion hole of the plurality of wire contact insertion holes; determining that the wire contact insertion hole is a correct wire contact insertion hole; determining that the wire contact has been fully inserted into the correct wire contact insertion hole; and providing feedback indicating that the wire contact is fully inserted into the correct wire contact insertion hole. The feedback includes in some cases a first indicator indicating that the wire contact is in the correct wire contact insertion hole and a second indicator indicating that the wire contact is fully inserted into the correct wire contact insertion hole.

20 Claims, 13 Drawing Sheets

(56) References Cited

U.S. PATENT DOCUMENTS

| | | | |
|---|---|---|---|
| 11,374,374 B2* | 6/2022 | Graber-Tilton | B25J 13/085 |
| 11,670,894 B2* | 6/2023 | Hoffmann | H01R 13/641 |
| | | | 700/259 |
| 2009/0199396 A1 | 8/2009 | Shelley et al. | |
| 2021/0044069 A1* | 2/2021 | Hoffmann | B25J 15/00 |
| 2021/0044070 A1* | 2/2021 | Graber-Tilton | B25J 13/085 |
| 2021/0399470 A1* | 12/2021 | Hoffmann | G06T 7/70 |

OTHER PUBLICATIONS

He Jun Hu et al., "Intelligent Vision Based Wire Connection Checking System for Control Cabinet," SIEMENS AG, 1-4, (Feb. 3, 2021).
European Application No. 23158439.2, Extended European Search Report mailed Sep. 12, 2023.
Blacken, L. et al., U.S. Appl. No. 17/660,320, filed Apr. 22, 2022.

* cited by examiner

METHOD AND SYSTEM FOR MACHINE DETERMINING WIRE CONTACT INSERTION

TECHNICAL FIELD

A method, system and computer program product are provided in accordance with an example embodiment for determining wire contact insertion, and more particularly, to visually identifying and confirming that a wire contact has been fully inserted and seated within a connector.

BACKGROUND

Wire bundles consisting of a plurality of wires are utilized in a variety of industries to carry a myriad of different types of signals. The wire of a wire bundle assembly must frequently be terminated with a wire contact and the resulting wire end is inserted into a wire contact insertion hole of a connector, such as in a rubber grommet of a connector. As each wire of a wire bundle is unique and may carry a different type of signal, the wire ends of a wire bundle assembly must be inserted into specific wire contact insertion holes of a connector in order to make the proper connections.

The wire ends of a wire bundle assembly may be manually inserted into the respective wire contact insertion holes defined by a connector. As wire bundle assemblies commonly include dozens or possibly hundreds of wires, this manual connection process may be relatively time consuming and error prone and, as a result, may increase the cost of the overall assembly including the wire bundle assembly. As such, automated techniques to insert the wire ends of a wire bundle assembly into the wire contact insertion holes of a connector have been developed in an effort to reduce the time expended to make the connections and to correspondingly reduce the cost of the resulting assembly. Wire bundle assembly in an automated manner has limitations and is not suitable for all scenarios. Further, automated wire insertion techniques may improperly insert wire contacts into a connector, thereby halting the automated process and requiring correction.

BRIEF SUMMARY

A method, system and computer program product are provided for determining wire contact insertion, and more particularly, to visually identifying and confirming that a wire contact has been inserted and seated within a connector. Embodiments provided herein include a system for verifying insertion of a wire contact into a wire contact insertion hole of a connector including: at least one image acquisition device configured to acquire an image of a connector having a plurality of wire contact insertion holes; and processing circuitry in communication with the at least one image acquisition device configured to process images from the at least one image acquisition device, where the processing circuitry is configured to: identify a wire contact within a wire contact insertion hole of the plurality of wire contact insertion holes based on the images from the at least one image acquisition device; determine that the wire contact insertion hole is a correct wire contact insertion hole; and provide feedback indicating that the wire contact is fully inserted into the correct wire contact insertion hole.

The processing circuitry of certain embodiments is further configured to determine that the wire contact has been fully inserted into the correct wire contact insertion hole, where the feedback indicating that the wire contact is inserted into the correct wire contact insertion hole includes, in some embodiments, a first indicator indicating that the wire contact is in the correct wire contact insertion hole and a second indicator indicating that the wire contact is fully inserted into the correct wire contact insertion hole. According to some embodiments, the first indicator and the second indicator include at least one of a visual indication, an audible indication, or a tactile indication. The processing circuitry configured to determine that the wire contact insertion hole is the correct wire contact insertion hole includes, in some embodiments, processing circuitry configured to: receive an identifier of the correct wire contact insertion hole; visually loop-through available wire contact insertion holes of the plurality of wire contact insertion holes to identify a new wire contact within an available wire contact insertion hole of the available wire contact insertion holes; and determine that the available wire contact insertion hole is the correct wire contact insertion hole based on the identifier of the correct wire contact insertion hole.

According to certain embodiments, the available wire contact insertion holes of the plurality of wire contact insertion holes include wire contact insertion holes that have not received a fully wire contact. The processing circuitry configured to determine that the wire contact has been inserted into the correct wire contact insertion hole includes, in some embodiments, processing circuitry configured to: obtain a wire contact insertion hole mask for the correct wire contact insertion hole; adjust the wire contact insertion hole mask for the correct wire contact insertion hole; apply adaptive thresholding to detect the wire contact within the correct wire contact insertion hole; obtain a wire contact radius by obtaining a smallest circle that encircles the wire contact within the correct wire contact insertion hole; and determine that the wire contact radius satisfies a wire contact radius threshold to establish that the wire contact is fully inserted into the correct wire contact insertion hole.

The processing circuitry configured to determine that the wire contact has been inserted into the correct wire contact insertion hole includes, in some embodiments, processing circuitry configured to determine that the wire contact has been inserted to at least a threshold depth into the correct wire contact insertion hole. The at least one image acquisition device includes, in some embodiments, two or more image acquisition devices configured to acquire images of the connector having the plurality of wire contact insertion holes from at least two different viewing angles, where a depth into which the wire contact has been inserted into the correct wire contact insertion hole is determined using triangulation between images from the at least two different viewing angles.

Embodiments provided herein include an apparatus including at least one processor and at least one memory and computer program code configured to, with the processor, cause the apparatus to at least: acquire at least one image of a connector having a plurality of wire contact insertion holes; identify a wire contact within a wire contact insertion hole of the plurality of wire contact insertion holes based on the at least one image; determine that the wire contact insertion hole is a correct wire contact insertion hole; and provide feedback indicating that the wire contact is inserted into the correct wire contact insertion hole.

According to certain embodiments, the apparatus is further caused to determine that the wire contact has been fully inserted into the correct wire contact insertion hole, where the feedback indicating that the wire contact is inserted into the correct wire contact insertion hole includes a first indicator indicating that the wire contact is in the correct wire contact insertion hole and a second indicator indicating that the wire contact is fully inserted into the correct wire contact insertion hole. According to some embodiments, the first indicator and the second indicator include at least one of a visual indication, an audible indication, or a tactile indication. Causing the apparatus of some embodiments to determine that the wire contact insertion hole is the correct wire contact insertion hole includes causing the apparatus to: receive an identifier of the correct wire contact insertion hole; visually loop-through available wire contact insertion holes of the plurality of wire contact insertion holes to identify a new wire contact within an available wire contact insertion hole of the available wire contact insertion holes; and determine that the available wire contact insertion hole is the correct wire contact insertion hole based on the identifier of the correct wire contact insertion hole.

According to certain embodiments, the available wire contact insertion holes of the plurality of wire contact insertion holes include wire contact insertion holes that have not received an inserted wire contact. Causing the apparatus of some embodiments to determine that the wire contact has been inserted into the correct wire contact insertion hole includes, in some embodiments, causing the apparatus to: obtain a wire contact insertion hole mask for the correct wire contact insertion hole; adjust the wire contact insertion hole mask for the correct wire contact insertion hole; apply adaptive thresholding to detect the wire contact within the correct wire contact insertion hole; obtain a wire contact radius by obtaining a smallest circle that encircles the wire contact within the correct wire contact insertion hole; and determine that the wire contact radius satisfies a wire contact radius threshold to establish that the wire contact is fully inserted into the correct wire contact insertion hole.

According to certain embodiments, causing the apparatus to determine that the wire contact has been inserted into the correct wire contact insertion hole includes causing the apparatus to determine that the wire contact has been inserted to at least a threshold depth into the correct wire contact insertion hole. According to some embodiments, the at least one image acquisition device includes two or more image acquisition devices configured to acquire images of a connector having a plurality of wire contact insertion holes from at least two different viewing angles, where a depth into which the wire contact has been inserted into the correct wire contact insertion hole is determined using triangulation between images from the at least two different viewing angles.

Embodiments provided herein include a method including: acquiring at least one image of a connector having a plurality of wire contact insertion holes; identifying a wire contact within a wire contact insertion hole of the plurality of wire contact insertion holes based on the at least one image; determining that the wire contact insertion hole is a correct wire contact insertion hole; and providing feedback indicating that the wire contact is inserted into the correct wire contact insertion hole. The method of certain embodiments further includes determining that the wire contact has been fully inserted into the correct wire contact insertion hole, where the feedback indicating that the wire contact is inserted into the correct wire contact insertion hole includes, in some embodiments, a first indicator indicating that the wire contact is in the correct wire contact insertion hole and a second indicator indicating that the wire contact is fully inserted into the correct wire contact insertion hole.

According to certain embodiments, the first indicator and the second indicator include at least one of a visual indication, an audible indication, or a tactile indication. According to some embodiments, determining that the wire contact insertion hole is in the correct wire contact insertion hole includes: receiving an identifier of the correct wire contact insertion hole; visually looping-through available wire contact insertion holes of the plurality of wire contact insertion holes to identify a new wire contact within an available wire contact insertion hole of the available wire contact insertion holes; and determining that the available wire contact insertion hole is the correct wire contact insertion hole based on the identifier of the correct wire contact insertion hole.

BRIEF DESCRIPTION OF THE DRAWINGS

Figure 1:
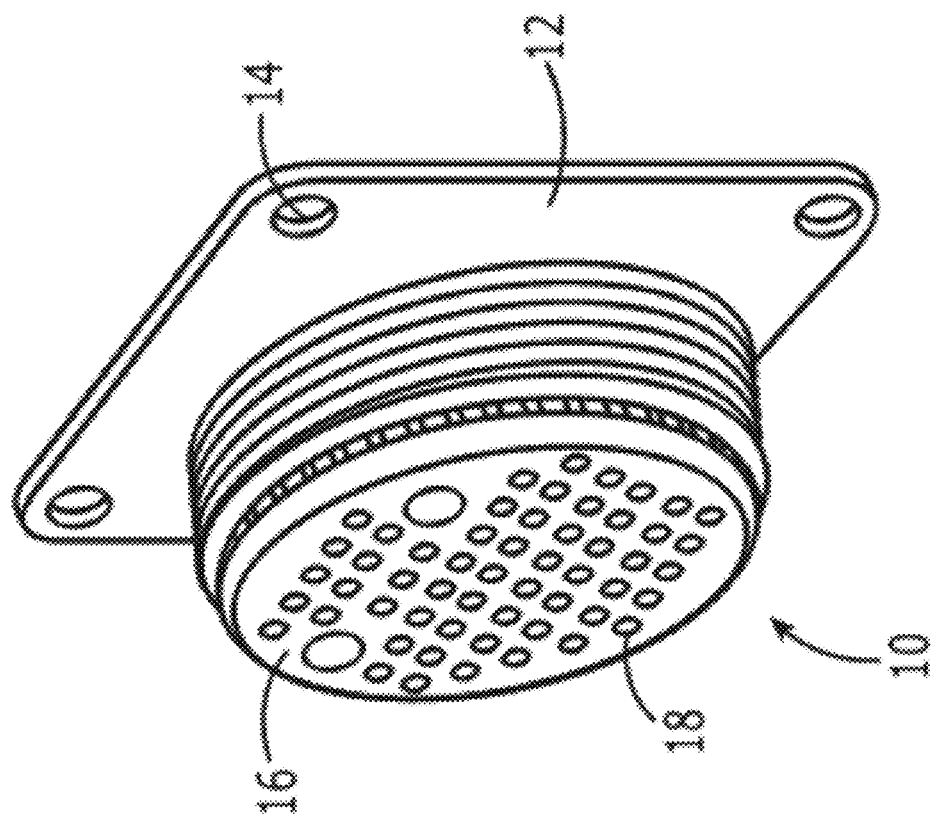
Figure 2:
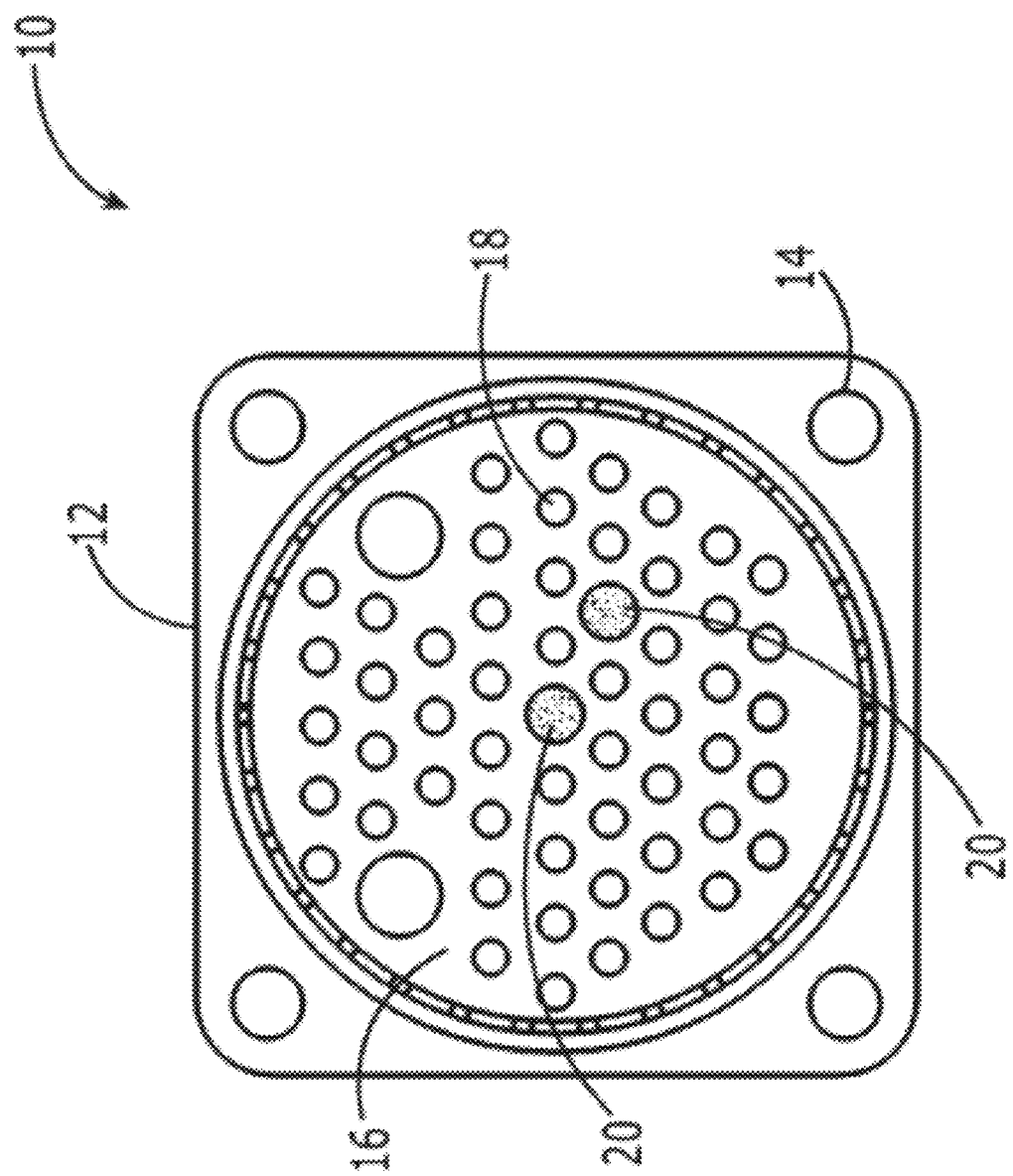
Figure 3:
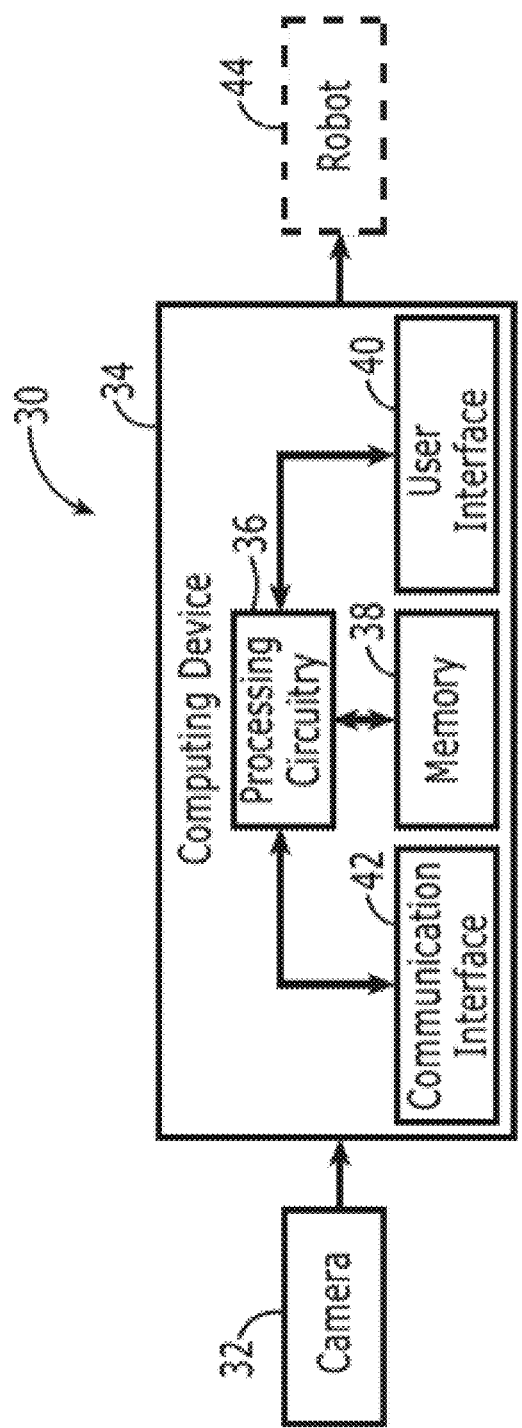
Figure 4:
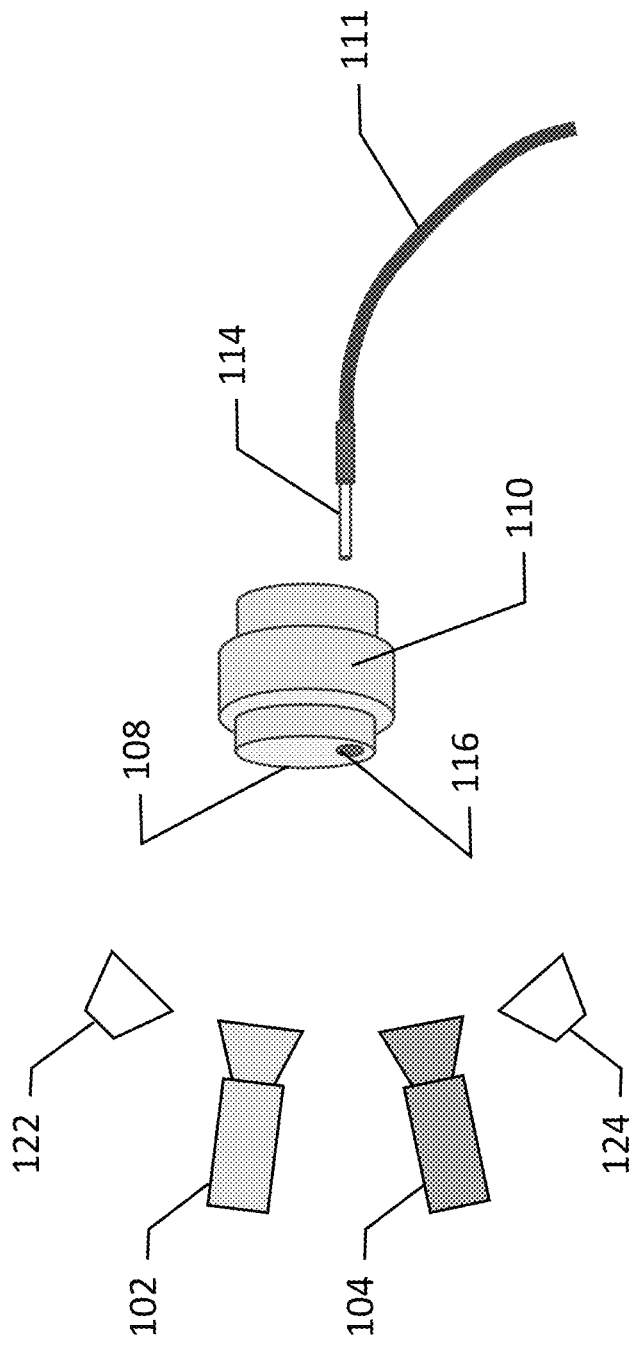
Figure 5:
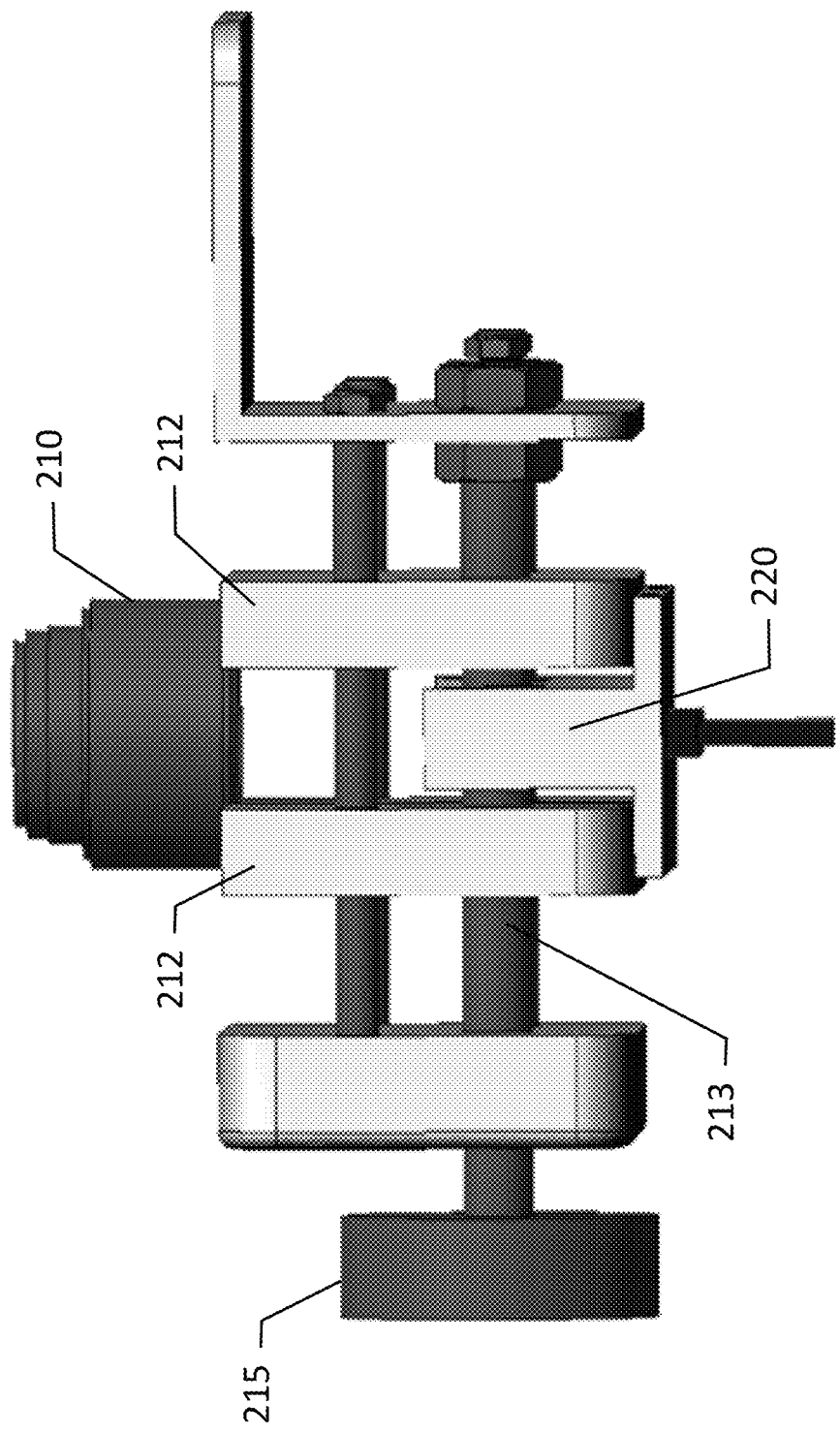
Figure 6:
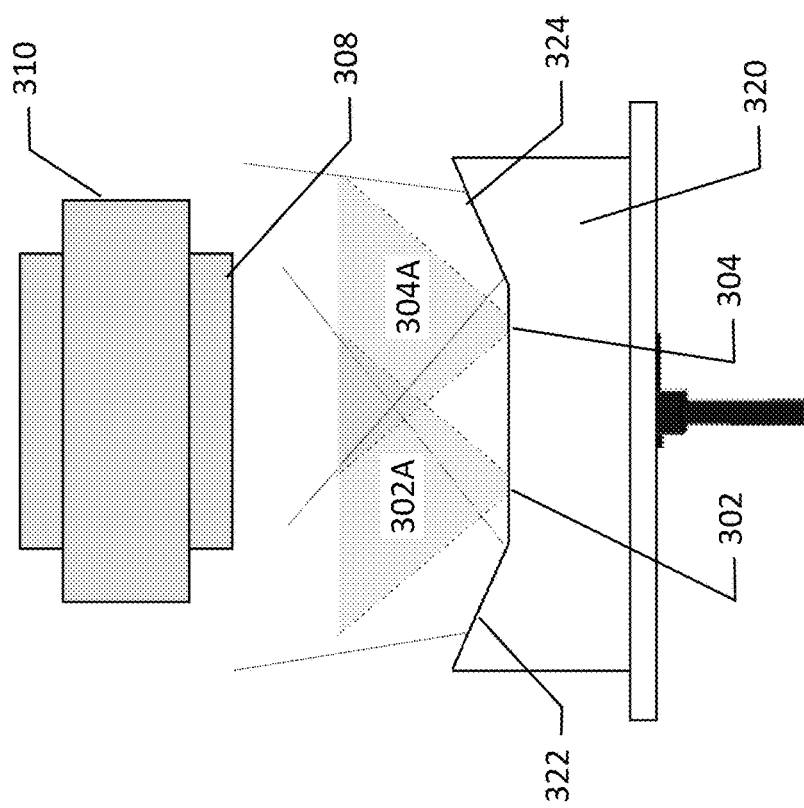
Figure 7:
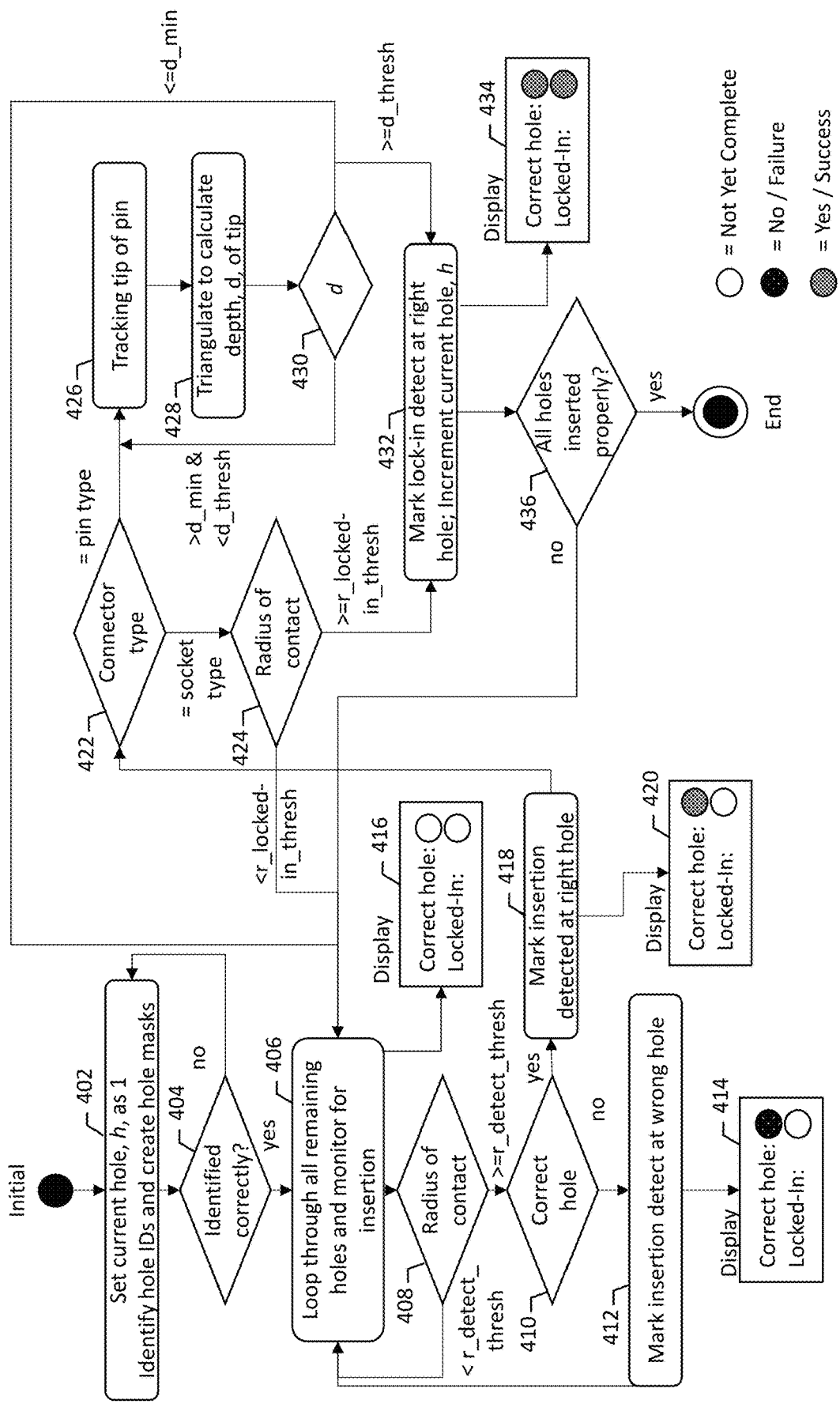
Figure 8:
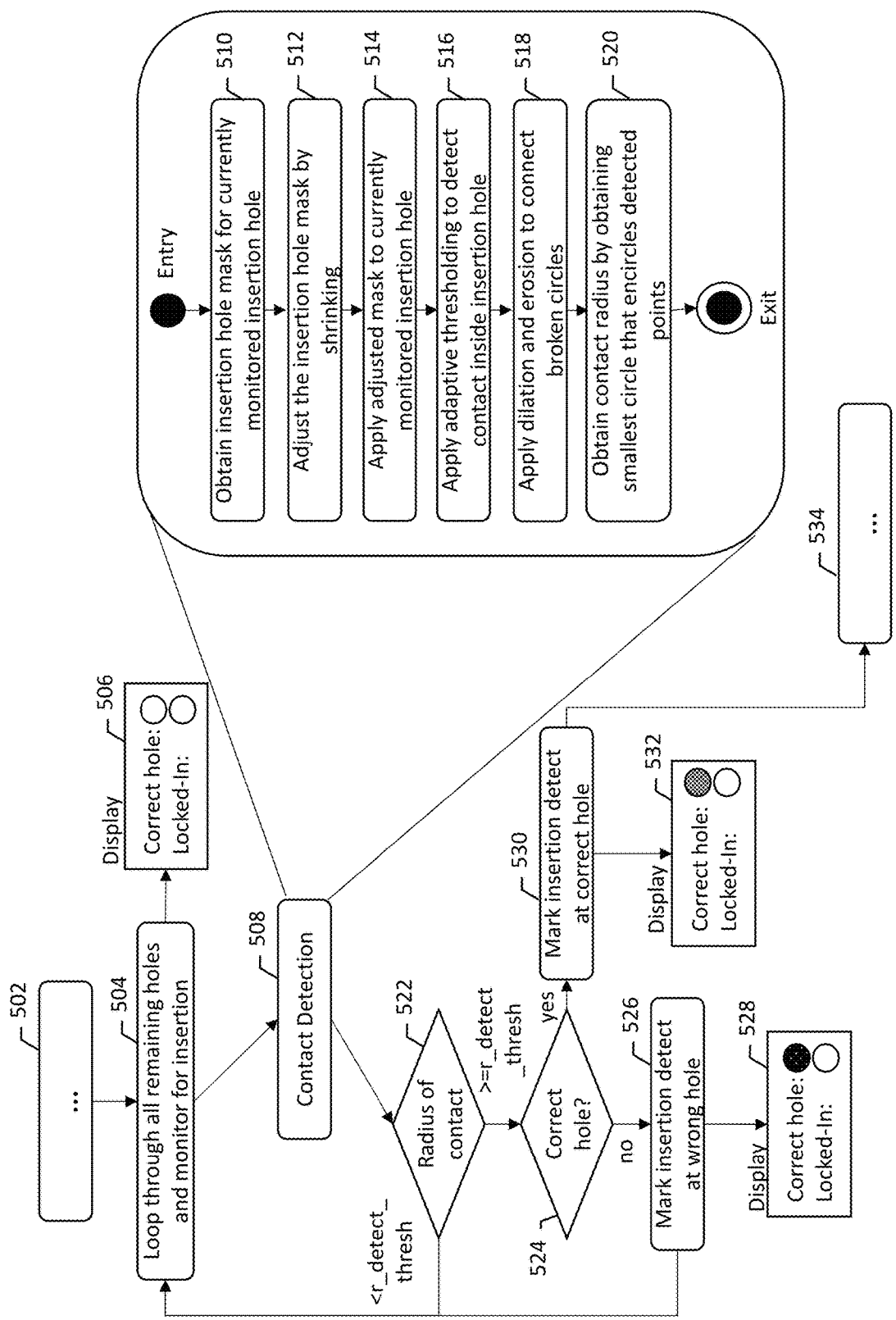
Figure 9:
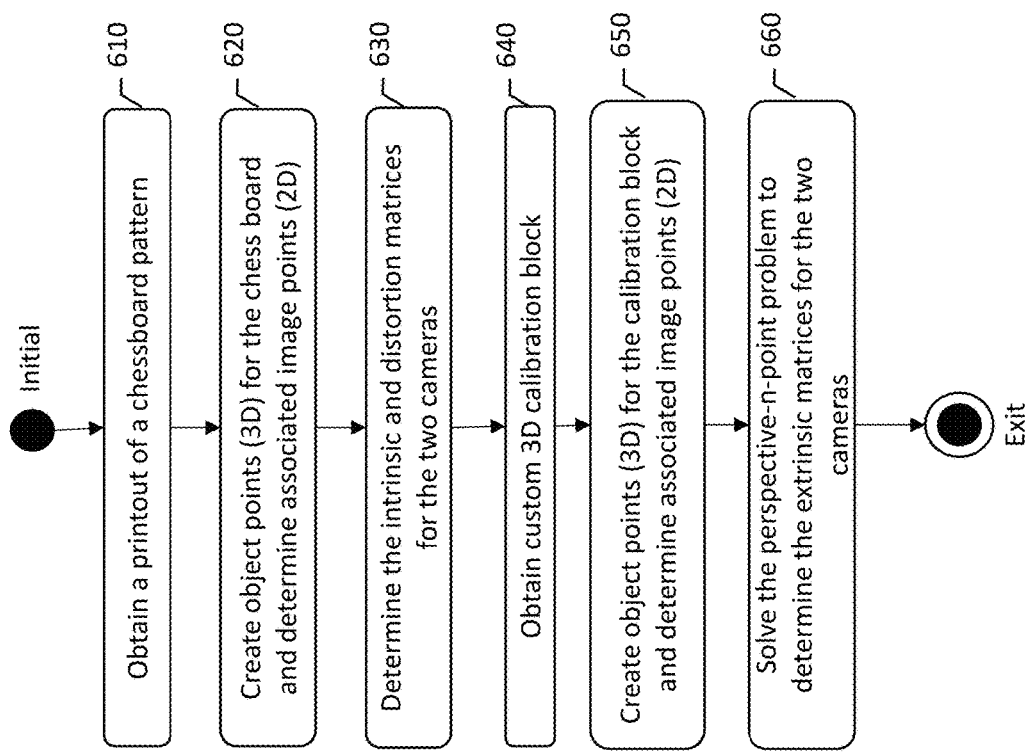
Figure 10:
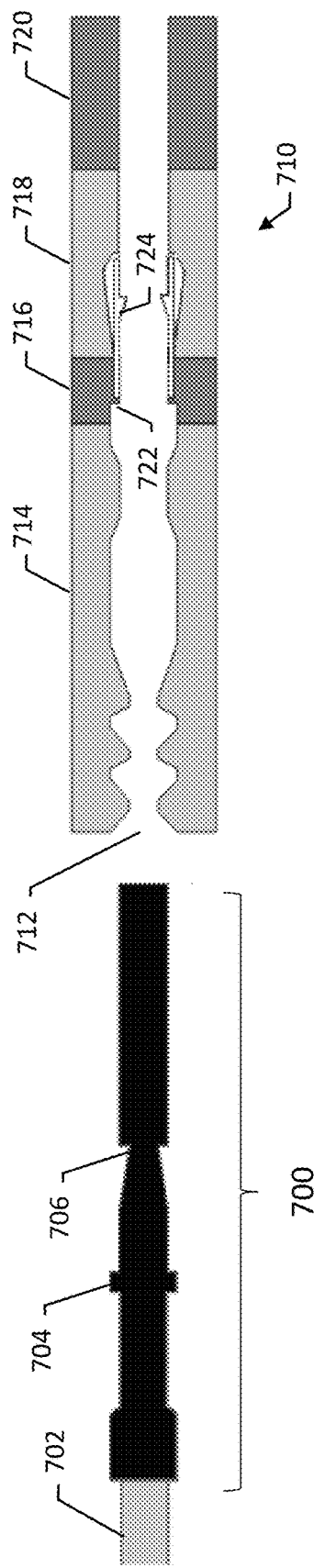
Figure 11:
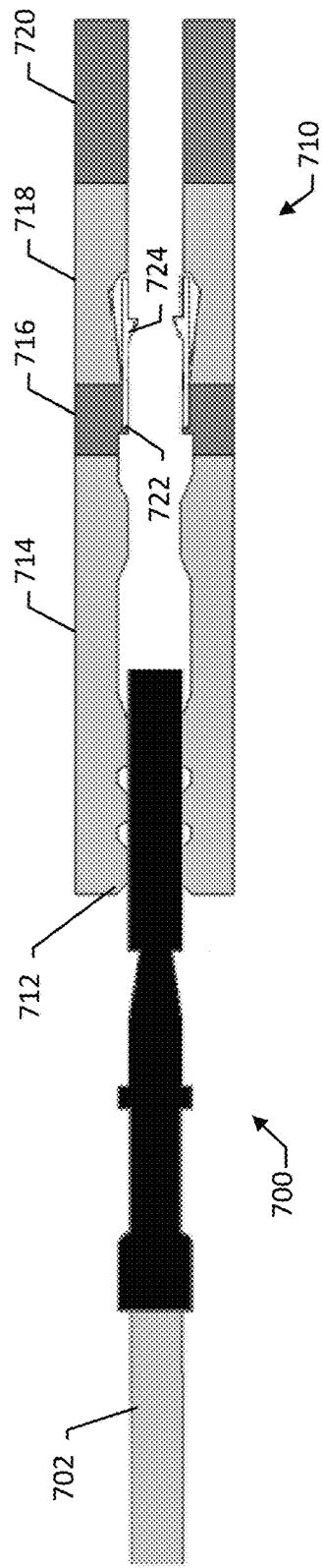
Figure 12:
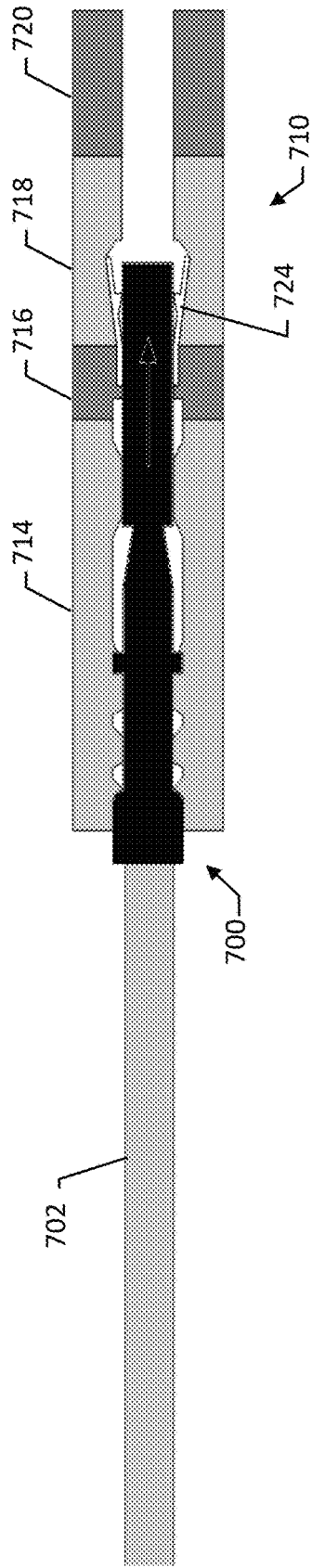
Figure 13:
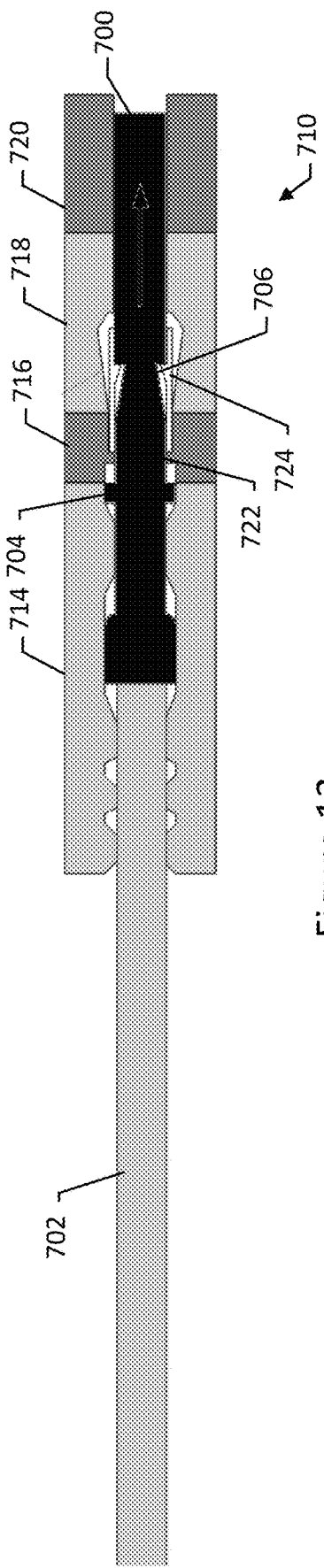
Figure 14:
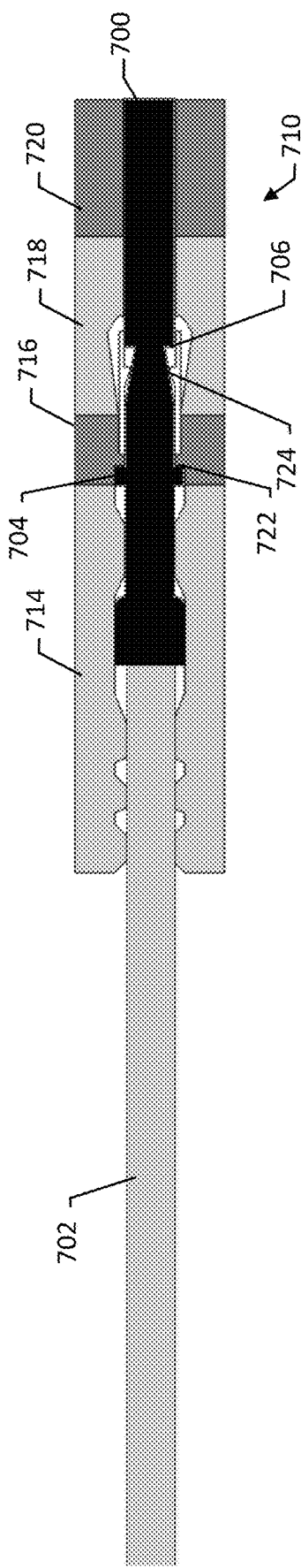
Figure 15:
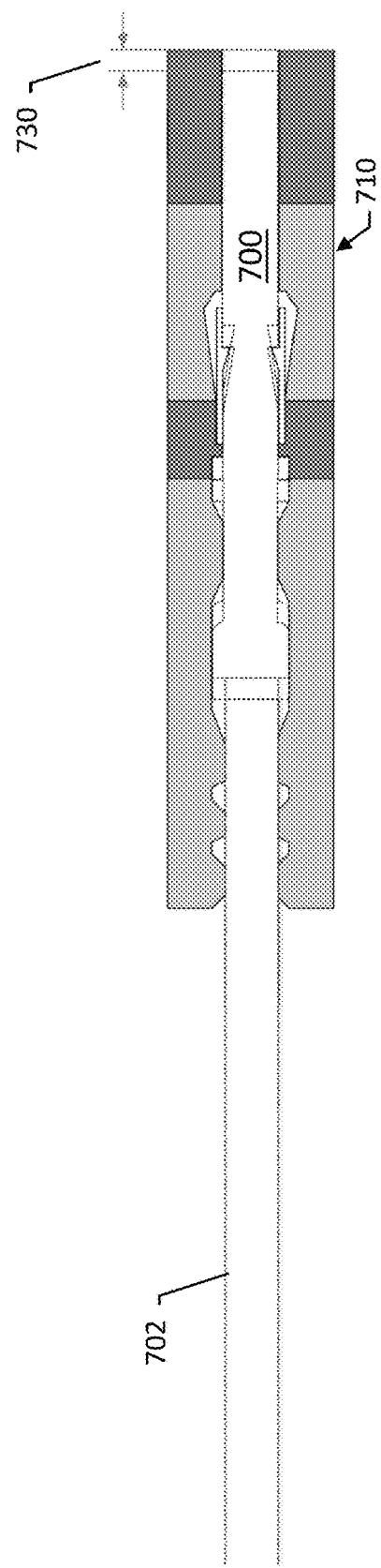
Figure 16:
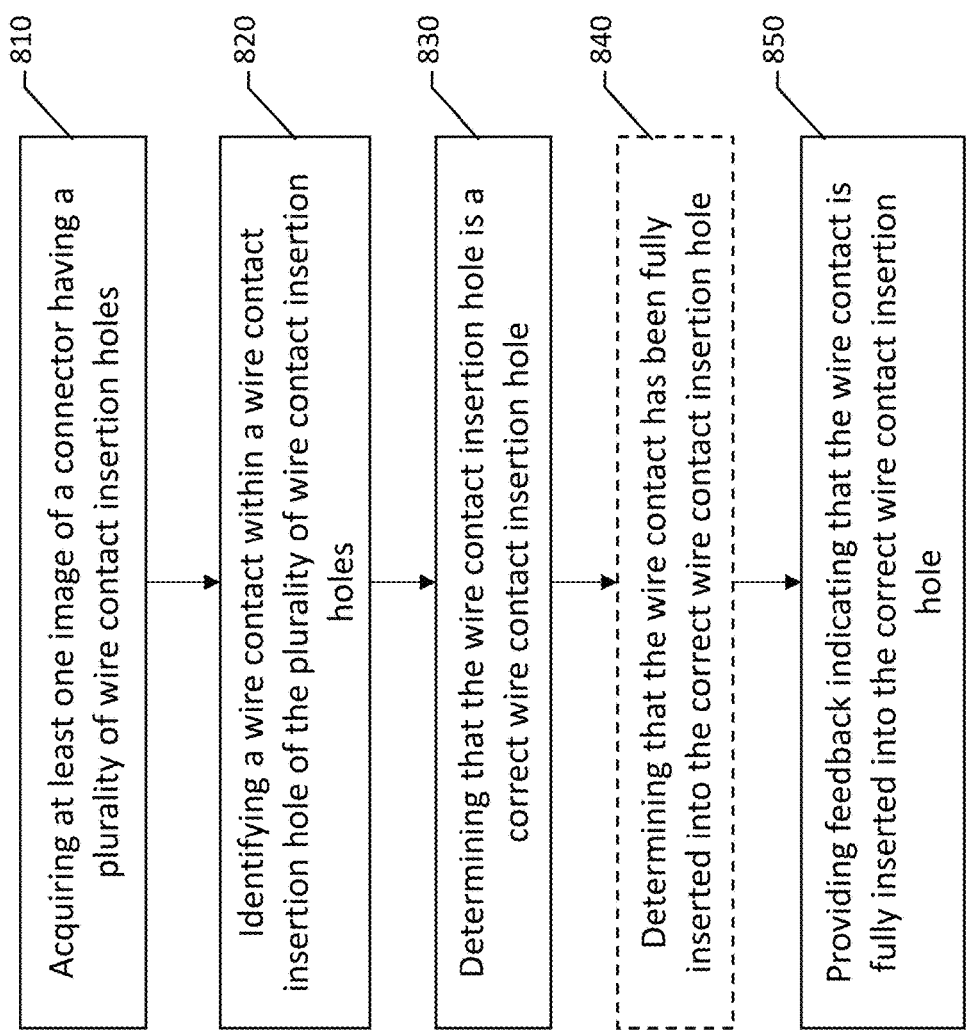

Having thus described certain example embodiments of the present disclosure in general terms, reference will hereinafter be made to the accompanying drawings which are not necessarily drawn to scale, and wherein:

FIG. 1 is a perspective view of a connector according to an example embodiment of the present disclosure;

FIG. 2 is a front view of the connector of FIG. 1 according to an example embodiment of the present disclosure;

FIG. 3 is a block diagram of the system that may be specifically configured in accordance with an example embodiment of the present disclosure;

FIG. 4 depicts components of a system for determining if a wire contact is fully inserted into the correct wire contact insertion hole of a connector according to an example embodiment of the present disclosure;

FIG. 5 depicts another arrangement of components of a system for determining if a wire contact is fully inserted into the correct wire contact insertion hole of a connector according to an example embodiment of the present disclosure;

FIG. 6 illustrates a schematic diagram of components of a system for determining if a wire contact is fully inserted into the correct wire contact insertion hole of a connector according to an example embodiment of the present disclosure;

FIG. 7 is a process flow diagram for determining if a wire contact is fully inserted into the correct wire contact insertion hole of a connector according to an example embodiment of the present disclosure;

FIG. 8 is a process flow diagram for a wire contact detection within a wire contact insertion hole of a connector according to an example embodiment of the present disclosure;

FIG. 9 illustrates a process flow diagram for calibrating image acquisition devices according to an example embodiment of the present disclosure;

FIG. 10 illustrates a wire contact and wire contact insertion hole before insertion of the wire contact according to an example embodiment of the present disclosure;

FIG. 11 illustrates a wire contact and wire contact insertion hole as the insertion of the wire contact begins according to an example embodiment of the present disclosure;

FIG. 12 illustrates a wire contact and wire contact insertion hole as the insertion of the wire contact continues according to an example embodiment of the present disclosure;

FIG. 13 illustrates a wire contact and wire contact insertion hole with the wire contact fully inserted according to an example embodiment of the present disclosure;

FIG. 14 illustrates a wire contact and wire contact insertion hole with the wire contact fully inserted according to an example embodiment of the present disclosure;

FIG. 15 illustrates the degree of movement between a wire contact and wire contact insertion hole with the wire contact fully inserted according to an example embodiment of the present disclosure; and FIG. 16 illustrates a process flow diagram for determining if a wire contact is fully inserted into the correct wire contact insertion hole of a connector according to an example embodiment of the present disclosure.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A method, system, and computer program product are provided in accordance with an example embodiment described herein for determining wire contact insertion, and more particularly, to visually identifying and confirming that a wire contact has been fully inserted and seated within a connector. Proper insertion of a wire contact within a connector is critical to ensure proper contact is made within the connector between mating wire contacts. Proper insertion is defined as the insertion of the wire and attached wire contact into the correct wire contact insertion hole and insertion to the correct depth, generally past a locking mechanism that retains the wire contact within the connector. Embodiments described herein provide feedback indicating when a wire contact is inserted into the wrong hole or inserted to an insufficient depth. There are four general states of a wire connector identified by embodiments described herein: incorrect wire contact insertion hole, incorrect depth; correct wire contact insertion hole, incorrect depth; incorrect wire contact insertion hole, correct depth; and correct wire contact insertion hole, correct depth. The only acceptable state for proper connector assembly is correct wire contact insertion hole and correct depth. The holes of a connector are designated with an identifier to receive a specific wire and wire contact for proper connection to a mating connector with another wire and wire contact. Improper hole location for a wire can result in crossed-wires and improper function of devices communicating through wires of the connector.

Embodiments of the present disclosure improve the quality and reliability of wire connector assembly by reducing the number of quality defects for wire contact insertion. Unseated wire contacts or wire contacts not properly locked in place can present a significant quality issue in any application where wire connectors are used. Embodiments provided herein detects unseated contacts in real-time during the insertion process. Further, the capability to verify wire contact insertions can be used for manual or robotic/automated wire connector assembly. Robotic wire contact insertion is a key component in the automation of wire bundle assembly. Robotic wire bundle assembly can increase production efficiency and accuracy, while reducing costs, reducing rework, and reducing injuries that may be sustained through manual assembly. Further, embodiments provide clear feedback to alert a controller (or user) of whether a wire contact has been properly inserted and seated or not, thereby reducing the number of human interventions or touch points during assembly of a connector.

The assembly of wire bundles including the attachment of one or more wire connectors to the wire bundle has traditionally been a labor-intensive process that is both time consuming and introduces opportunities for errors in the assembly. Embodiments described herein enable the automatic assembly of wire bundles and their associated wire connectors and provide a mechanism for confirming that a wire contact is properly inserted in the correct wire contact insertion hole and is fully seated within the correct wire contact insertion hole. In particular, embodiments provide for the automatic determination of the correct insertion of a wire contact without requiring user intervention.

A method, system and computer program product are provided in accordance with an example embodiment in order to determine wire contact insertion, and more particularly, to visually identify and confirm that a wire contact has been fully inserted and seated within a correct wire contact hole of a connector. One example of a connector is depicted in FIGS. 1 and 2 in the form of a connector 10. As shown, the connector 10 includes a housing 12 and a rubber grommet 16 disposed therein. Although the housing 12 may be configured differently for other types of connectors, the housing of the connector 10 of the embodiment of FIGS. 1 and 2 is externally threaded to facilitate, for example, the secure threaded engagement of a wire bundle assembly or another connector therewith. The connector 10 of FIGS. 1 and 2 also includes a radially extending flange defining a plurality of openings 14, such as for receiving screws or other fasteners for mounting the connector to an assembly. Although the connector 10 of FIG. 1 has a cylindrical shape, the connector of other example embodiments may have different sizes and shapes. With regard to the example connector of FIGS. 1 and 2, a rubber grommet 16 is disposed within the housing and the rubber grommet defines a plurality of wire contact insertion holes 18. The wire contact insertion holes 18 defined by the rubber grommet 16 are configured, e.g., sized and shaped, such that a wire end consisting of a wire contact connected, e.g., crimped, to the end of a wire, is inserted into and mechanically retained within the wire contact insertion hole 18. Optionally, some wire contact insertion holes may receive therein seal plugs 20 to seal wire contact insertion holes of the connector that are unused in a specific implementation. The seal plugs offer protection against contaminants permeating the connector 10 and leading to possible corrosion or wire failures (e.g., open circuits or short circuits), or entry of contaminants into an otherwise sealed area beyond the connector.

As shown by the example of the connector 10 of FIGS. 1 and 2, the plurality of wire contact insertion holes 18 defined by the rubber grommet 16, are arranged in a predefined pattern. In some embodiments, not all of the wire contact insertion holes of a connector 10 will be used and instead, only a subset of the wire contact insertion holes will receive and make electrical connection with corresponding wire ends of the wire bundle assembly. As illustrated in FIG. 2, the wire contact insertion holes 18 defined by the rubber grommet 16 that are not to be used in conjunction with a particular application may be sealed by the insertion a seal plug 20 into the respective wire contact insertion hole defined by the rubber grommet. Although a connector 10 that may be analyzed in accordance with an example embodiment of the present disclosure is depicted in FIGS. 1 and 2 and will be described hereinafter, the method, system and computer program product of an example embodiment may be used in conjunction with a wide variety of other connectors and the connector is illustrated and described by way of example, but not of limitation.

Referring now to FIG. 3, a system for visually identifying and confirming that a wire contact has been fully inserted and seated within a connector is depicted. As shown, the system 30 includes one or more cameras 32 configured to acquire images of the connector 10. While plural cameras are indicated in FIG. 3, embodiments may employ a single camera, or may employ a single camera operating with mirrors to provide various perspectives of the connector 10 using a single camera. The cameras described herein are a type of image acquisition device, where a variety of image acquisition device types may be used in place of a camera. Image acquisition devices, generally, acquire or capture an image of the field of view of the device. A camera, as described herein, acquires an image of the field of view in the visible light spectrum and processes the image accordingly. The cameras 32 may be configured to acquire a gray scale image of the connector 10. Alternatively, the cameras 32 may be configured to acquire color images of the connector 10. In an embodiment in which color images of the connector 10 are acquired, the image associated with each different color channel of the cameras 32, such as the red, green, and blue color channels, may be averaged to create a composite image for subsequent analysis and review. Alternatively, the different color channels of the cameras 32 may be separately analyzed, such as to identify and distinguish a wire contact from the grommet of a connector. The cameras 32 are generally configured to acquire images of the front face of the connector 10, such as shown in FIG. 2, such that the plurality of wire contact insertion holes 18 defined by the rubber grommet 16 and the seal plugs 20 are clearly visible.

In addition to the cameras 32, the system 30 of FIG. 3 includes a computing device 34 configured to analyze the images of the connector 10 acquired by the cameras and to identify wire contact insertion holes of the connector and wire contacts received therein. As also shown in FIG. 3, the system 30 of an example embodiment optionally includes or is in communication with a robot 44 and, more particularly, a robotic end effector that is used to insert wire ends/contacts into respective candidate contact insertion holes of the connector 10 based upon the identification of the wire contact insertion holes of the connector and the wire contacts by the computing device 34. The robot 44 is employed in example embodiments in which automated wire contact insertion is used to insert the wire contacts into respective wire contact insertion holes. In such an embodiment, the process described herein for visually identifying and confirming that a wire contact has been fully inserted and seated within the connector can be used as a feedback mechanism to help guide the automated insertion of the wire contacts. The robot 44 is depicted in dashed lines to clarify that it is not necessary for embodiments described herein which can be used to confirm appropriate insertion of wire contacts whether inserted manually by a user, automatically by a robot, or a combination thereof.

The computing device 34 may be configured in various manners and, as such, may be embodied as a personal computer, a tablet computer, a computer workstation, a mobile computing device such as a smartphone, a server, or the like. Regardless of the manner in which the computing device 34 is embodied, the computing device of an example embodiment includes or is otherwise associated with processing circuitry 36, memory 38, and optionally a user interface 40 and a communication interface 42 for performing the various functions herein described. The processing circuitry 36 may, for example, be embodied as various means including one or more microprocessors, one or more coprocessors, one or more multi-core processors, one or more controllers, one or more computers, various other processing elements including integrated circuits such as, for example, an ASIC (application specific integrated circuit) or FPGA (field programmable gate array), or some combination thereof. In some example embodiments, the processing circuitry 36 is configured to execute instructions stored in the memory 38 or otherwise accessible to the processing circuitry. These instructions, when executed by the processing circuitry 36, may cause the computing device 34 and, in turn, the system 30 to perform one or more of the functionalities described herein. As such, the computing device 34 may comprise an entity capable of performing operations according to an example embodiment of the present disclosure while configured accordingly. Thus, for example, when the processing circuitry 36 is embodied as an ASIC, FPGA or the like, the processing circuitry and, correspondingly, the computing device 34 may comprise specifically configured hardware for conducting one or more operations described herein. Alternatively, as another example, when the processing circuitry 36 is embodied as an executor of instructions, such as may be stored in the memory 38 the instructions may specifically configure the processing circuitry and, in turn, the computing device 34 to perform one or more algorithms and operations described herein.

The memory 38 may include, for example, volatile and/or non-volatile memory. The memory 38 may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory 38 may comprise any non-transitory computer readable storage medium. The memory 38 may be configured to store information, data, applications, instructions, or the like for enabling the computing device 34 to carry out various functions in accordance with example embodiments of the present disclosure. For example, the memory 38 may be configured to store program instructions for execution by the processing circuitry 36.

The user interface 40 may be in communication with the processing circuitry 36 and the memory 38 to receive user input and/or to provide an audible, visual, mechanical, or other output to a user. As such, the user interface 40 may include, for example, a display for providing an image acquired by the camera 32 and/or an image visually depicting the wire contacts inserted within a wire contact insertion hole of a connector. Other examples of the user interface 40 include a keyboard, a mouse, a joystick, a microphone and/or other input/output mechanisms.

The communication interface 42 may be in communication with the processing circuitry 36 and the memory 38 and may be configured to receive and/or transmit data, such as by receiving images from the camera 32 and transmitting information, such as a confirmation or alert regarding whether a wire contact was properly inserted and seated within the correct wire contact insertion hole of a connector. This information can be provided to a user, or in the case of a substantially automated wire contact insertion process, to a controller of a robot 44 to confirm proper wire contact insertion or alert the controller and/or robot that a wire contact is not yet properly inserted. The communication interface 42 may include, for example, one or more antennas and supporting hardware and/or software for enabling communications with a wireless communication network. Additionally or alternatively, the communication interface 42 may include the circuitry for interacting with the antenna(s) to cause transmission of signals via the antenna(s) or to handle receipt of signals received via the antenna(s). In some environments, the communication interface 42 may alternatively or also support wired communication.

Referring now to FIG. 4, a block diagram of an example embodiment of a system performing the methods described herein is shown including image acquisition devices including a first camera 102 and a second camera 104 and connector 110 having connector face 108. The connector is held in a substantially fixed position during operations described herein. A wire 111 including a wire contact 114 are illustrated approaching the connector 110 from an insertion side of the connector, while the image acquisition devices including the first camera 102 and the second camera 104 are disposed on a connector face side of the connector. On the connector face 108 is illustrated a single target wire contact insertion hole 116 for ease of illustration as connectors will include a plurality of wire contact insertion holes. The first camera 102 and the second camera 104 are mounted in a position that the connector face 108 is within their field of view. The cameras of the illustrated embodiment of FIG. 4 are offset and angled with respect to one another. However, while the cameras are preferably offset from one another, their angle relative to the connector need not differ as the relative offset will provide a stereoscopic view of the connector face 108. Also illustrated are light sources including a first light source 122 and second light source 124. While two light sources are illustrated, fewer light sources may be used with the aid of reflective light (e.g., a mirror) to ensure light is provided along at least two illumination paths. The light sources are configured to illuminate the connector face 108 along at least two illumination paths to minimize shadows within the wire contact insertion holes of the connector. Optionally, a halo light source can be used to provide light from numerous paths about the connector face.

While multiple cameras and multiple light sources are provided in the illustrated embodiment, it is possible to employ the process described herein using a single camera and a single light source by moving the connector face 108 or the light source and camera relative to one another to provide functionality similar to that of employing two or more cameras and two or more light sources. Such an embodiment increases complexity through requiring movement of the connector and/or the camera and light source, and increases the processing time since multiple images from multiple orientations may be required.

While the embodiment of FIG. 4 includes two cameras, embodiments may include more cameras. Further, a single camera may be used in conjunction with mirrors to observe different perspectives of the wire contact and the connector using the single camera. Capturing multiple perspectives, such as using two or more cameras, may enable greater accuracy when identifying the presence and insertion depth of a wire contact within a wire contact insertion hole as described further below.

The orientation of the connector 110 is not of critical importance and can be selected based on a preferred connector orientation for insertion of the wire contacts. In some embodiments, for example, a wire connector face 108 may face downward, with the cameras angled upward to capture images of the connector face. The opposite orientation is also feasible, along with any other orientation of the connector that facilitates wire contact insertion. The orientation of the cameras and the light sources relative to the connector ensure the connector face 108 is both illuminated along two or more paths and captured in the field of view of two or more cameras.

FIG. 5 illustrates a profile view of a system of example embodiments in a compact form factor. As illustrated, a connector 210 is positioned atop a pair of supports 212 that may be adjustable relative to one another along a guide rail 213, such as by rotation of handle 215. Optionally, the pair of supports 212 can function as a vice to grasp the connector 210 or a portion thereof to hold the connector firmly in place. An inspection unit 220 is illustrated disposed below the connector 210. The inspection unit 220 includes therein a first camera, second camera, first illumination device, and second illumination device.

FIG. 6 illustrates a profile view of the inspection unit 320 and the connector 310 with the pair of supports omitted. As shown, the inspection unit 320 includes a first camera 302 having a first field of view 302A and a second camera 304 having a second field of view 304A. A first illumination device 322 is provided angled toward the connector from a first position while a second illumination device 324 is provided angled toward the connector from a second position. The illumination devices illuminate the connector face 308 while the cameras capture images of the connector face.

Having described the hardware and the configurations of example embodiments, further described herein is the process of employing the aforementioned system to visually identify and confirm that a wire contact has been fully inserted and seated within a target wire contact insertion hole of a connector. According to example embodiments described herein, processing circuitry, such as processing circuitry 26 of computing device 34, receives images captured by one or more cameras, such as camera 32, to determine the status of any insertion operations. Prior to identifying and confirming wire contact insertion, the cameras are calibrated to obtain the intrinsic and extrinsic parameters of the cameras. Prior to inserting wire contacts into a new connector, camera image masks are created for all of the wire contact insertion holes on the surface of the connector. With the masks, the process described herein can loop through the different holes to check if an insertion is detected at a particular wire contact insertion hole. While analysis could focus on a single, target wire contact insertion hole, by looping through the different holes, the insertion of a wire contact in a wrong hole (different than the target wire contact insertion hole) can be readily identified.

FIG. 7 if a flowchart of a process as described herein for visually identifying and confirming that a wire contact has been fully inserted and seated within a connector. As shown at 402, a current hole is established, and hole masks are created. The hole identifiers can be determined from a connector map that identifies contact insertion holes by number, for example. If the hole identifiers correspond with the pattern identified on the connector at 404, the process continues. If the hole identifiers fail to correspond with the pattern identified on the connector at 404, the wire contact holes are re-identified at 402. This process of hole identification can be performed by each camera separately to establish a confidence and correspondence between the cameras and the hole pattern identified. According to such an embodiment, the process flow of 402 and 404 can be performed for each camera, and the process for each camera must separately satisfy the correct wire contact insertion hole identification for the process to continue.

Once the hole pattern is established at 404, all remaining holes are looped through while monitoring for insertion at 406. At this point, a display may indicate at 416 that the correct wire contact insertion hole for a wire contact has not yet been found, and a contact is not inserted in that correct target wire contact insertion hole. Once a contact is detected in a wire contact insertion hole, the process checks the contact's radius against a threshold value obtained empirically at 408. This is to prevent false positives due to surrounding noise. If the detected contact's radius is less than the threshold value at 408, it is assumed to be noise and not an actual inserted contact. If the radius satisfies the threshold, a contact is positively detected and the process proceeds. The hole in which the contact is detected is identified and the algorithm determines the hole identification. The hole identification is compared against an intended target wire contact insertion hole at 410 to determine if the wire contact has been inserted into the correct wire contact insertion hole. In an automated connector assembly process, the intended target wire contact insertion hole can be established based on a target wire contact insertion hole of a robot inserting the wire contact, identified by a hole identifier. In a manual connector assembly process, the target wire contact insertion hole can be established based on user input of the target hole identifier, or from a device providing instruction or guidance to a user inserting the wire directing them to the proper target wire contact insertion hole. If the wire contact is detected in a hole other than the target wire contact insertion hole, the improper insertion is identified at 412, and the display shows a failure for the "correct hole" status at 414. This may be, for example, a flashing red light to alert the operator or a system of the incorrect wire contact insertion hole insertion. If this occurs, the process returns to monitoring all holes for wire contact insertions at 406. The incorrect wire contact insertion hole alert can be provided to a robot in an automated process whereby the robot withdraws the wire contact and re-attempts, or in a manual process to a person who then attempts to find the correct wire contact insertion hole.

If the detected, inserted wire contact is determined to be in the target wire contact insertion hole at 410, the insertion is marked as being at the correct wire contact insertion hole at 418 and presented on display at 420 indicating that the correct wire contact insertion hole is successful. The process continues to determine if the wire contact is locked in or secured within the wire contact insertion hole. The processes for establishing whether a wire contact is secured within the connector differs between a pin-type contact and a socket-type contact. A pin-type contact of a first connector is received within a socket-type contact of a second connector when the first connector is mated to the second connector. If the connector is a pin-type contact as determined at 422, the algorithm will begin tracking the tip of the detected contact at 426. The depth of a contact within the connector is calculated through triangulation at 428. If the calculated depth of the pin contact within the wire contact insertion hole is above a minimum but below a threshold, the process continues tracking the tip of the pin contact at 426 until the depth satisfies the threshold (>=d_thresh). If the tip of the contact is below a minimum depth threshold (<d_min), the algorithm presumes the insertion was a mistake and the pin contact is being or has been withdrawn from the wire contact insertion hole.

If the connector type is determined to be a socket type at 422, a radius of the wire contact is checked against a threshold that establishes the contact as locked-in. If the radius of the contact is greater than or equal to the locked-in threshold (>=r_locked-in_thresh), the socket-type contact is determined to be locked in at 432, as a deeper inserted socket-type contact appears larger in the camera images. If the radius is lower than the locked-in threshold value (<r_locked-in_thresh), the algorithm presumes the insertion was erroneous and continues looping through the remaining holes of the connector at 406. When a contact is established to be locked-in in the correct wire contact insertion hole at 432, the display may present an indication of satisfaction of the correct wire contact insertion hole and satisfaction of being locked-in at 434. If all holes are properly filled in with wire contacts that are secured at 436, the process is complete. If not, the process continues to loop through remaining wire contact insertion holes monitoring for contact insertion. After a contact insertion is deemed successful (i.e., within the correct wire contact insertion hole and locked-in properly), the process checks for a next insertion which has a new target wire contact hole identifier. According to an example embodiment, the process can exclude wire contact insertion holes that have successfully received a wire contact and only look to remaining vacant holes. While the illustrated embodiment of FIG. 7 depicts a display depicting whether the current hole has been achieved and whether full insertion or "locked-in" has been achieved, embodiments can include any form of visual indicator, audible indicator, or tactile indicator to inform a user of the status of the wire contact insertion process.

Contact detection uses vision detection to detect a wire contact properly and reliably within a wire contact insertion hole. This is depicted in the process flow of FIG. 8 with the process beginning at 502, the process of FIG. 8 being a more detailed portion of the correct wire contact insertion hole detection process of FIG. 7. The process of looping through remaining wire contact insertion holes is shown at 504, with a display depicting no result for the correct wire contact insertion hole or the contact locked-in as shown at 506. The process of contact detection occurs after one of the remaining wire contact insertion holes is selected for monitoring at 508. The monitored wire contact insertion hole mask is obtained at 510. The insertion hole mask is adjusted by shrinking it down using a shrink factor at 512. The purpose of shrinking the insertion hole mask is that the insertion hole mask also contains the edge of the wire contact insertion hole, which is to be excluded from consideration as a wire contact. Thus to only look inside the wire contact insertion hole for contact detection, the degrees of the wire contact insertion hole are removed by shrinking the mask down. A shrink factor may be about 90%, which shrinks the radius of the mask by 10%, for example. This shrink factor is customizable and can be learned based on the connector and the generated masks. The adjusted mask is then applied to the monitored wire contact insertion hole at 514, thus isolating only what is inside the monitored wire contact insertion hole.

According to the illustrated embodiment, adaptive thresholding is applied at 516, such as using the OpenCV threshold method, where the hyperparameters are obtained empirically through trial and error, to create a binary image of just the wire contact tip which shows as a circle. Dilation and erosion are applied at 518 to smooth the contact tip image. Finally, the isolated contact is encircled using the smallest circle possible. The radius of the contact is determined as the radius of the encircling circle. This process flow can be performed for each camera. The process continues as with the process shown in FIG. 7, shown with the radius of the contact determined at 522. If the radius is below a threshold (<r_detect_thresh), the process presumes an erroneous insertion and the contact is to be removed. If the radius satisfies a threshold (>=r_detect_thresh), the process continues noting that a wire contact is being inserted. It is determined at 524 whether the wire contact is in the correct wire contact insertion hole. If not, insertion is marked at the wrong hole, and an alert may be presented, such as on display 528. If the wire contact is detected in the correct wire contact insertion hole at 530, the process may present an indication of such at 532 on the display. The process then continues to determine whether the wire contact is locked in from 534.

FIGS. 10-15 illustrate the wire contact insertion process and the importance of properly and fully inserting a wire contact into a wire contact insertion hole. As shown in FIG. 10, a wire contact 700 is positioned at the end of a wire 702. A portion 710 of a connector is also depicted including a single wire contact insertion hole 712. The wire contact 700 includes features that engage the wire contact insertion hole of a connector including a shoulder 704 and retention groove 706. The wire contact insertion hole includes features that retain a wire contact once inserted. The features in the wire contact insertion hole of the illustrated embodiment are merely illustrative and need not all be present in every connector, but are illustrated to demonstrate an example of a wire contact engaging with a wire contact insertion hole. As shown, the wire contact insertion hole 712 includes rubber insulation support 714, a plastic dielectric block 716, a rubber section 718, and a second plastic dielectric block 720. The rubber insulation support 714 and rubber section 718 may each be of a flexible material, enabling a wire contact to displace or stretch these portions to better grasp and seal the wire contact within the connector. Connectors for different purposes or different requirements, such as with Ingress Protection ratings (e.g., IP-67 compliant, IP-68 compliant, etc.) may have different requirements and different elements. The wire contact insertion hole 712 of the illustrated embodiment further includes a shoulder stop 722 that is part of the plastic dielectric block 716 and a retention clip 724, which may be of a metal or plastic material sufficient to retain or help retain the wire contact 700 within the wire contact insertion hole. The retention clip 724 of the depicted embodiment is supported on the shoulder stop 722.

FIG. 11 illustrates a tip of the wire contact entering the wire contact insertion hole 712, pressing through the initial rubber insulation support 714. FIG. 12 illustrates the wire contact 700 further inserted, with a tip of the wire contact advancing past and pressing the retention clip 724 away from the wire contact as it passes through the rubber section 718. FIG. 13 illustrates the wire contact 700 further advanced past the retention clip 724 to a position where the retention clip springs back to engage the retention groove 706 of the wire contact. At this point the wire contact is retained by the retention clip 724, and can be considered fully inserted. However, as shown, there remains room for further insertion as the shoulder 704 has not yet engaged or abutted the shoulder stop 722. FIG. 14 illustrates the wire contact 700 inserted to the point where the shoulder 704 of the wire contact engages the shoulder stop 704, which prevents the wire contact from being further inserted into the connector. The delta in movement between the fully inserted position of FIG. 13 and the fully inserted position of FIG. 14 is the "play" in the insertion depth within which the wire contact is deemed fully inserted. FIG. 15 illustrates the play 730 between the wire contact 700 and the wire contact insertion hole of the portion 710 of the wire connector. This play renders determining full insertion of a wire contact more difficult since there is not a single relative position between the wire contact and the wire contact insertion hole that constitutes fully inserted. Embodiments described herein are capable of identifying full insertion, regardless of where in the "play" between the wire contact and the wire contact insertion hole the wire contact is positioned. At a minimum fully-inserted depth (shown in FIG. 13) a threshold depth of insertion has been achieved at which point the wire contact is established as fully inserted. This threshold depth is used to visually establish when the wire contact is seated and locked in according to example embodiments described herein.

As noted above, the process differs between pin-type contacts and socket-type contacts. The difference between the detection and tracking problem is how the frames captured by the cameras are used. In a detection problem, the frames are treated as independent of each other and the object is re-detected in every frame from scratch, searching through all of the pixels, typically globally. The tracking problem, on the other hand, treats the frames as dependent on each other. In the initial frame, a tracking region of interest is selected and as the frames progress, a new search is conducted locally around the previous region of interest. Thus, a tracking problem is less computationally extensive and can use the entire image without much preprocessing. Though the processes for socket-type and pin-type contacts are similar, the primary difference is what occurs after an insertion attempt at the correct wire contact insertion hole has occurred. In the case of a socket-type contact because the socket lies inside the bounds of the mask, the socket is re-detected every frame focusing solely inside of the insertion hole, as described above. Then, by determining the radius of the socket contact, it is compared to a locked-in threshold value, determined empirically. If the contact radius satisfies the locked-in threshold value, the socket-type contact is considered locked-in.

For pin-type contacts, because the pin tends to extrude out of the bound of the mask (e.g., past the connector face), the pin is tracked the moment an insertion attempt is detected at the correct wire contact insertion hole. Rather than re-detecting every frame like the socket-type contact, the pin-type is re-tracked every frame using the Discriminative Correlation Filter with Channel and Spatial Reliability (DCF-CSR) tracker implemented in OpenCV. Through tracking the pin-type contact, the process can calculate the center of the pin or the tip. Then the real-time insertion checker algorithm goes through a triangulation operation to determine a depth value of the tip of the pin. The extrinsic camera calibration parameters are used for this triangulation. The depth value is then compared to a locked-in depth value, determined empirically. If the depth is larger than the locked-in depth value, the pin-type contact is determined to be locked-in.

For proper wire contact identification and depth determination, the cameras require calibration. During the process of determining the correct wire contact insertion hole and the locked-in depth of a contact, the cameras act as the only feedback provider. Thus, it is vital to ensure that the cameras are properly calibrated prior to using them in the real-time insertion checking process. There are two main reasons to calibrate the cameras. The first reason is to remove any distortions caused by the camera lens. The second reason is to properly determine the camera property matrices (intrinsic, extrinsic, distortion). With the camera properties matrices, triangulations can be performed to determine a depth value of an associated two-dimensional point found by both cameras.

The overall camera calibration process is broken into two parts. The first part includes the determination of the intrinsic matrices and distortion matrices of the cameras. Then, using the determined intrinsic and distortion matrices, the extrinsic matrices are determined. These matrices are what are used to triangulate a point in three-dimensional space, obtaining the depth value of a two-dimensional point found in both camera images. For the first step, a 9×6 (nine corners along the x-axis and six corners along the y-axis) chessboard image print out is used. Object points in three-dimensional coordinates of those 54 corners are then manually created. Image points in two-dimensional coordinates are determined from the camera images using OpenCV's built-in calibration function. With the object points created and image points determined for each of the cameras, the intrinsic matrices and distortion matrices are then calculated using OpenCV's build-in camera-calibration function. For the second step, a custom three-dimensional calibration block with pins of varying depth can be used. Object points in three-dimensional coordinates of the 64 pins are stored in a database. Image points in two-dimensional coordinates are determined by locating each of the pins in the camera images and determining the center of each of the pins. The extrinsic matrices are calculated by solving the perspective-n-point problem using OpenCV's built-in function and the three-dimensional and corresponding pairs of two-dimensional coordinates.

FIG. 9 illustrates a flowchart of the overall process flow of the calibration process. As shown, a printout of the chessboard pattern is obtained at 610. Object points in three-dimensional coordinates are created and associated image points in two-dimensional coordinates are determined at 620. The intrinsic and distortion matrices for the two cameras are determined at 630. A custom three-dimensional calibration block is obtained at 640. The object points are created in three-dimensions for the calibration block and the associated two-dimensional image points are determined at 650. The perspective-n-point problem is solved to determine the extrinsic matrices for the two cameras at 660.

FIG. 16 is a flowchart of a process for visually identifying and confirming that a wire contact has been fully inserted and seated within a connector. According to the illustrated embodiment, at least one image is acquired of a connector having a plurality of wire contact insertion holes at 810. A wire contact is identified at 820 within a wire contact insertion hole of the plurality of wire contact insertion holes. A determination is made at 830 as to whether the wire contact insertion hole is a correct wire contact insertion hole. According to certain embodiments, a determination is made at 840 whether the wire contact has been fully inserted into the correct wire contact insertion hole. At 850, feedback is provided indicating that the wire contact is inserted into the correct wire contact insertion hole, and in embodiments in which a determination is made as to whether the wire contact is fully inserted, the feedback further provides an indication if the wire contact is fully inserted into the correct wire contact insertion hole.

As described above, FIGS. 7, 8, 9, and 16 illustrate flowcharts and process flow diagrams of a system 30, method, and computer program product according to example embodiments of the present disclosure. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory 38 of a system 30 employing an embodiment of the present disclosure and executed by the processing circuitry 36 of the system 30. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art having the benefit of the teachings presented in the foregoing descriptions and the associated drawings. Therefore, it is to be understood that the present application is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A system configured to verity insertion of a wire contact into a wire contact insertion hole of a connector, wherein the system comprises:
    at least one image acquisition device configured to acquire an image of a connector having a plurality of wire contact insertion holes; and
    processing circuitry in communication with the at least one image acquisition device and configured to:
        process images from the at least one image acquisition device;
        identify a wire contact within a wire contact insertion hole of the plurality of wire contact insertion holes based on the images from the at least one image acquisition device;
        obtain a wire contact insertion hole mask for the wire contact insertion hole;
        adjust the wire contact insertion hole mask for the wire contact insertion hole;

apply adaptive thresholding to detect the wire contact within the wire contact insertion hole;
obtain a wire contact radius by obtaining a smallest circle that encircles the wire contact within the wire contact insertion hole; and
determine that the wire contact radius satisfies a wire contact radius threshold to establish that the wire contact is fully inserted into a correct wire contact insertion hole; and
provide feedback that indicates that the wire contact is inserted into the correct wire contact insertion hole.

2. The system of claim 1, wherein the processing circuitry is further configured to determine that the wire contact has been fully inserted into the correct wire contact insertion hole, wherein the feedback comprises a first indicator that indicates that the wire contact is in the correct wire contact insertion hole and a second indicator that indicates that the wire contact is fully inserted into the correct wire contact insertion hole.

3. The system of claim 2, wherein the first indicator and the second indicator include at least one of a visual indication, an audible indication, or a tactile indication.

4. The system of claim 1, wherein the processing circuitry configured to determine that the wire contact insertion hole is the correct wire contact insertion hole comprises processing circuitry configured to:
receive an identifier of the correct wire contact insertion hole;
visually loop-through available wire contact insertion holes of the plurality of wire contact insertion holes to identify a new wire contact within an available wire contact insertion hole of the available wire contact insertion holes; and
determine that the available wire contact insertion hole is the correct wire contact insertion hole based on the identifier of the correct wire contact insertion hole.

5. The system of claim 4, wherein the available wire contact insertion hole of the plurality of wire contact insertion holes comprises a wire contact insertion hole lacking an inserted wire contact.

6. The system of claim 1, wherein the wire contact insertion hole comprises a locking mechanism configured to retain the wire contact within the connector.

7. The system of claim 1, wherein the processing circuitry configured to determine that the wire contact has been inserted into the correct wire contact insertion hole comprises processing circuitry configured to:
determine that the wire contact has been inserted to at least a threshold depth into the correct wire contact insertion hole.

8. The system of claim 7, wherein the at least one image acquisition device comprises two or more image acquisition devices configured to acquire images of the connector having the plurality of wire contact insertion holes from at least two different viewing angles, wherein a depth into which the wire contact has been inserted into the correct wire contact insertion hole is determined using triangulation between images from the at least two different viewing angles.

9. An apparatus that comprises:
at least one processor; and
at least one memory that comprises computer program code configured to, with the processor, cause the apparatus to at least:
acquire at least one image of a connector having a plurality of wire contact insertion holes;
identify a wire contact within a wire contact insertion hole of the plurality of wire contact insertion holes based on the at least one image;
obtain a wire contact insertion hole mask for a correct wire contact insertion hole;
adjust the wire contact insertion hole mask for the correct wire contact insertion hole;
apply adaptive thresholding to detect the wire contact within the correct wire contact insertion hole;
obtain a wire contact radius by obtaining a smallest circle that encircles the wire contact within the correct wire contact insertion hole;
determine that the wire contact radius satisfies a wire contact radius threshold to establish that the wire contact is fully inserted into the correct wire contact insertion hole; and
provide feedback that indicates that the wire contact is inserted into the correct wire contact insertion hole.

10. The apparatus of claim 9, wherein the apparatus is further caused to determine that the wire contact has been fully inserted into the correct wire contact insertion hole, wherein the feedback indicating that the wire contact is inserted into the correct wire contact insertion hole comprises a first indicator indicating that the wire contact is in the correct wire contact insertion hole and a second indicator indicating that the wire contact is fully inserted into the correct wire contact insertion hole.

11. The apparatus of claim 10, wherein the first indicator and the second indicator include at least one of a visual indication, an audible indication, or a tactile indication.

12. The apparatus of claim 9, wherein causing the apparatus to determine that the wire contact insertion hole is the correct wire contact insertion hole comprises causing the apparatus to:
receive an identifier of the correct wire contact insertion hole;
visually loop-through available wire contact insertion holes of the plurality of wire contact insertion holes to identify a new wire contact within an available wire contact insertion hole of the available wire contact insertion holes; and
determine that the available wire contact insertion hole is the correct wire contact insertion hole based on the identifier of the correct wire contact insertion hole.

13. The apparatus of claim 12, wherein the available wire contact insertion hole of the plurality of wire contact insertion holes comprises a wire contact insertion hole lacking an inserted wire contact.

14. The apparatus of claim 9, wherein the correct wire contact insertion hole comprises a locking mechanism configured to retain the wire contact within the correct wire contact insertion hole.

15. The apparatus of claim 9, wherein causing the apparatus to determine that the wire contact has been inserted into the correct wire contact insertion hole comprises causing the apparatus to:
determine that the wire contact has been inserted to at least a threshold depth into the correct wire contact insertion hole.

16. The apparatus of claim 15, wherein causing the apparatus to acquire at least one image of the connector having a plurality of wire contact insertion holes comprises causing the apparatus to acquire at least two images of the connector from at least two different viewing angles, wherein a depth into which the wire contact has been inserted into the correct wire contact insertion hole is determined using triangulation between images from the at least two different viewing angles.

17. A method comprising:
acquiring images, from at least two different viewing angles, of a connector comprising a plurality of wire contact insertion holes;
inserting a wire contact into a wire contact insertion hole of the wire contact insertion holes;
identifying a wire contact within a wire contact insertion hole of the plurality of wire contact insertion holes based on the;
determining that the wire contact insertion hole is a correct wire contact insertion hole;
determining, using triangulation between the images from the at least two different viewing angles, a depth into which the wire contact is inserted into the correct wire contact insertion hole is at least a threshold depth; and
providing feedback indicating that the wire contact is inserted into the correct wire contact insertion hole.

18. The method of claim 17, further comprising determining that the wire contact has been fully inserted into the correct wire contact insertion hole, wherein the feedback indicating that the wire contact is inserted into the correct wire contact insertion hole comprises a first indicator that the wire contact is in the correct wire contact insertion hole and a second indicator that the wire contact is fully inserted into the correct wire contact insertion hole.

19. The method of claim 18, further comprising:
obtaining a wire contact radius by obtaining a smallest circle that encircles the wire contact within the correct wire contact insertion hole; and
determining that the wire contact radius satisfies a wire contact radius threshold establishing that the wire contact is fully inserted into the correct wire contact insertion hole, wherein the first indicator and the second indicator include at least one of a visual indication, an audible indication, or a tactile indication.

20. The method of claim 17, wherein determining that the wire contact insertion hole is the correct wire contact insertion hole comprises:
receiving an identifier of the correct wire contact insertion hole;
visually looping-through available wire contact insertion holes of the plurality of wire contact insertion holes to identify a new wire contact within an available wire contact insertion hole of the available wire contact insertion holes; and
determining that the available wire contact insertion hole is the correct wire contact insertion hole based on the identifier of the correct wire contact insertion hole.

* * * * *

UNITED STATES PATENT AND TRADEMARK OFFICE
CERTIFICATE OF CORRECTION

| | | |
|---|---|---|
| PATENT NO. | : 12,237,636 B2 | Page 1 of 1 |
| APPLICATION NO. | : 17/660327 | |
| DATED | : February 25, 2025 | |
| INVENTOR(S) | : Michael Cui, Heiko Hoffmann and Bradley J. Mitchell | |

It is certified that error appears in the above-identified patent and that said Letters Patent is hereby corrected as shown below:

In the Claims

Column 16, Line 50, Claim 1, correct "to verity insertion" to read -- to verify insertion --
Column 19, Line 11, Claim 17, correct "based on the;" to read -- based on the images; --
Column 19, Line 24, Claim 18, correct "first indicator that" to read -- first indicator indicating that --
Column 20, Line 1, Claim 18, correct "second indicator that" to read -- second indicator indicating that --

Signed and Sealed this
First Day of April, 2025

Coke Morgan Stewart
*Acting Director of the United States Patent and Trademark Office*